United States Patent
Chiplunkar et al.

(10) Patent No.: US 12,212,673 B2
(45) Date of Patent: Jan. 28, 2025

(54) SYSTEMS AND METHODS FOR FACILITATING SECURE BLOCKCHAIN OPERATIONS IN DECENTRALIZED APPLICATIONS USING CRYPTOGRAPHY-BASED, STORAGE APPLICATIONS IN COMPUTER NETWORKS

(71) Applicant: Coinbase, Inc., San Francisco, CA (US)

(72) Inventors: Ankit Chiplunkar, San Francisco, CA (US); Ben Schreck, San Francisco, CA (US); Matt Moore, San Francisco, CA (US); Olivia Thet, San Francisco, CA (US); Peter Jihoon Kim, San Francisco, CA (US); Trevor Aron, San Francisco, CA (US)

(73) Assignee: Coinbase, Inc., San Francisco, CA (US)

( * ) Notice: Subject to any disclaimer, the term of this patent is extended or adjusted under 35 U.S.C. 154(b) by 319 days.

(21) Appl. No.: 17/681,369

(22) Filed: Feb. 25, 2022

(65) Prior Publication Data
US 2023/0275757 A1    Aug. 31, 2023

(51) Int. Cl.
*H04L 9/08* (2006.01)
*H04L 9/00* (2022.01)
*H04L 9/32* (2006.01)

(52) U.S. Cl.
CPC .......... *H04L 9/0894* (2013.01); *H04L 9/3247* (2013.01); *H04L 9/50* (2022.05)

(58) Field of Classification Search
CPC ........ H04L 9/0894; H04L 9/3247; H04L 9/05
See application file for complete search history.

(56) References Cited

U.S. PATENT DOCUMENTS

| 11,626,990 B1* | 4/2023 | Weber ................... H04L 9/3247 713/178 |
| 2018/0365201 A1 | 12/2018 | Hunn et al. |
| 2019/0034923 A1 | 1/2019 | Greco et al. |

(Continued)

FOREIGN PATENT DOCUMENTS

EP    3 965 040 A1    3/2022

OTHER PUBLICATIONS

Non-Final Office Action issued in co-pending U.S. Appl. No. 17/681,276 on May 7, 2024.

*Primary Examiner* — Piotr Poltorak
*Assistant Examiner* — Lydia L Noel
(74) *Attorney, Agent, or Firm* — Foley & Lardner LLP

(57) ABSTRACT

Methods and systems disclosed herein recite the use of linking cryptography-based digital repositories in order to perform blockchain operations in decentralized applications. For example, the system may link a first cryptography-based, storage application (e.g., a first digital wallet) with a second first cryptography-based, storage application (e.g., a second digital wallet). The first cryptography-based, storage application may correspond to a first private key, and wherein the first private key is stored on a first user device. The second cryptography-based, storage application corresponds to a first partial private key and a second partial private key, wherein the first partial private key is stored on a first remote device, and wherein the second partial private key is stored on the first user device.

20 Claims, 7 Drawing Sheets

(56) References Cited

U.S. PATENT DOCUMENTS

| | | |
|---|---|---|
| 2019/0303623 A1 | 10/2019 | Reddy et al. |
| 2019/0303887 A1* | 10/2019 | Wright ................. H04L 9/0861 |
| 2019/0342084 A1 | 11/2019 | Mehedy et al. |
| 2020/0076601 A1 | 3/2020 | Jafari |
| 2020/0313897 A1 | 10/2020 | Heath et al. |
| 2021/0184833 A1* | 6/2021 | Srivastava .............. G06F 16/21 |
| 2022/0198563 A1 | 6/2022 | Kaplan et al. |
| 2022/0207022 A1* | 6/2022 | Wood .................. G06F 16/2379 |
| 2022/0318775 A1* | 10/2022 | Tomkins ............ G06Q 20/3674 |
| 2022/0405747 A1* | 12/2022 | Coughlan .......... G06Q 30/0283 |
| 2023/0006811 A1* | 1/2023 | Choo .................... H04L 9/0825 |

\* cited by examiner

SYSTEMS AND METHODS FOR FACILITATING SECURE BLOCKCHAIN OPERATIONS IN DECENTRALIZED APPLICATIONS USING CRYPTOGRAPHY-BASED, STORAGE APPLICATIONS IN COMPUTER NETWORKS

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. By doing so, the proliferation of the blockchain may proceed indefinitely.

SUMMARY

Methods and systems are described herein for novel uses and/or improvements to blockchains and blockchain technology. As one example, methods and systems are described herein for linking cryptography-based digital repositories and/or facilitating secure blockchain operations through the use of linked cryptography-based digital repositories. For example, due to the immutable nature of blockchain operations (e.g., transactions, smart contracts, etc.), blockchains and blockchain technology are well suited for facilitating operations without a central administrator. However, an inherent drawback to a system featuring no central administrator and/or governing body is that users subject to unauthorized actions by others have little recourse. As an example, while cryptography-based digital repositories are inherently safe as long as a user retains control of a private key corresponding to a given cryptography-based digital repository (e.g., digital wallet), if the private key is made public, an unauthorized entity could empty the cryptography-based digital repository of digital assets. In such cases, the user may have little ability to retrieve the digital assets.

In view of this, conventional systems rely on public key-private key pairing algorithms, and digital signature generation based on these algorithms that ensure that private keys are not made public during the digital signing process. Nonetheless, given the criticalness of a security breach involving a private key, and the ever-increasing use of the digital signing process with third-party decentralized applications (with each use presenting potential for a security breach), the need exists for a more robust security mechanism.

To overcome these technical deficiencies in conventional systems, methods and systems disclosed herein recite the use of linking cryptography-based digital repositories in order to perform blockchain operations in decentralized applications. Furthermore, in contrast to conventional systems, and to provide more robust security, these linked cryptography-based digital repositories have varying key structures. For example, the system may link a first cryptography-based, storage application (e.g., a first digital wallet) with a second first cryptography-based, storage application (e.g., a second digital wallet). The first cryptography-based, storage application may correspond to a first private key, and wherein the first private key is stored on a first user device. That is, the user (or user device) retains control over the entirety of the private key. The second cryptography-based, storage application corresponds to a first partial private key and a second partial private key, wherein the first partial private key is stored on a first remote device, and wherein the second partial private key is stored on the first user device. That is, the user (or user device) and a remote entity (or remote device) share control over the private key.

The system then uses a decentralized application browser to interact, and perform blockchain operations with, one or more decentralized applications. During these interactions, at most, only the second cryptography-based, storage application faces the potential for security breaches. However, the dual layer nature of this solution raises additional technical challenges. First, while the second cryptography-based, storage application creates a buffer for any potential security risks to the first cryptography-based, storage application, the user must nonetheless transfer digital assets to the second cryptography-based, storage application to perform the blockchain operations with the one or more decentralized applications. As such, the digital assets have been moved to a less secure state and thus out of the user's absolute control. To account for this, the second cryptography-based, storage application comprises a first key structure in which the user device and remote server share ownership of the private key. By doing so, neither entity may perform blockchain operations using the digital assets without the other. This provides a first layer of security (even from the remote server) for the digital assets.

While this ensures security of the transferred digital assets, it still creates a second technical problem in that the digital assets must nonetheless be transfer from the first cryptography-based, storage application to the second cryptography-based, storage application. This raises the additional technical problem in that a portion of the digital assets are no longer under the complete control of the user (e.g., the user requires the partial private key of the remote server). To minimize this technical problem, the system uses a decentralized application browser to link cryptography-based, storage applications upon creation of a user account, handle interactions with the other third-party decentralized applications (e.g., via a plurality of icons on a user interface of the decentralized application), and automatically transfer a predetermined amount of digital assets (e.g., corresponding to blockchain operations selected via the user interface) to the second cryptography-based, storage application (e.g., limiting the amount of digital assets not under the user's complete control).

In some aspects, the system may receive, at a first user interface for a decentralized application browser, a first user request, wherein the first user request requests creation of a first user account for the decentralized application browser, wherein the decentralized application browser performs a plurality of blockchain operations for digital assets stored in a first cryptography-based, storage application, wherein the first cryptography-based, storage application corresponds to a first private key, and wherein the first private key is stored on a first user device. The system may, in response to the first user request, generate the first user account. The system may, in response to generating the first user account, generate a second cryptography-based, storage application, wherein the second cryptography-based, storage application corresponds to a first partial private key and a second partial private key, wherein the first partial private key is stored on a first remote device, and wherein the second partial private key is stored on the first user device. The system may transfer the digital assets to the second cryptography-based, storage application. The system may perform, using the decentralized application browser, a blockchain operation of the plurality of blockchain operations with the digital assets.

In some aspects, the system may receive, via a user interface on a user device, a first user input, wherein the first user input requests access to a user account on a decentralized application for performing a plurality of blockchain operations. The system may generate for display, in the user interface, a first icon, wherein the first icon corresponds to a first cryptography-based, storage application corresponding to the user account, wherein the first cryptography-based, storage application corresponds to a first partial private key and a second partial private key, wherein the first partial private key is stored on a remote device, and wherein the second partial private key is stored on the user device. The system may generate for display, in the user interface, a second icon, wherein the second icon corresponds to a second cryptography-based, storage application corresponding to the user account, wherein the second cryptography-based, storage application corresponds to a third partial private key and a fourth partial private key, wherein the third partial private key is stored on the remote device, and wherein the fourth partial private key is stored on the user device. The system may receive, via the user interface on the user device, a second user input, wherein the second user input selects the first icon for performing a blockchain operation of the plurality of blockchain operations. The system may, in response to the second user input, perform the blockchain operation using the first cryptography-based, storage application.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
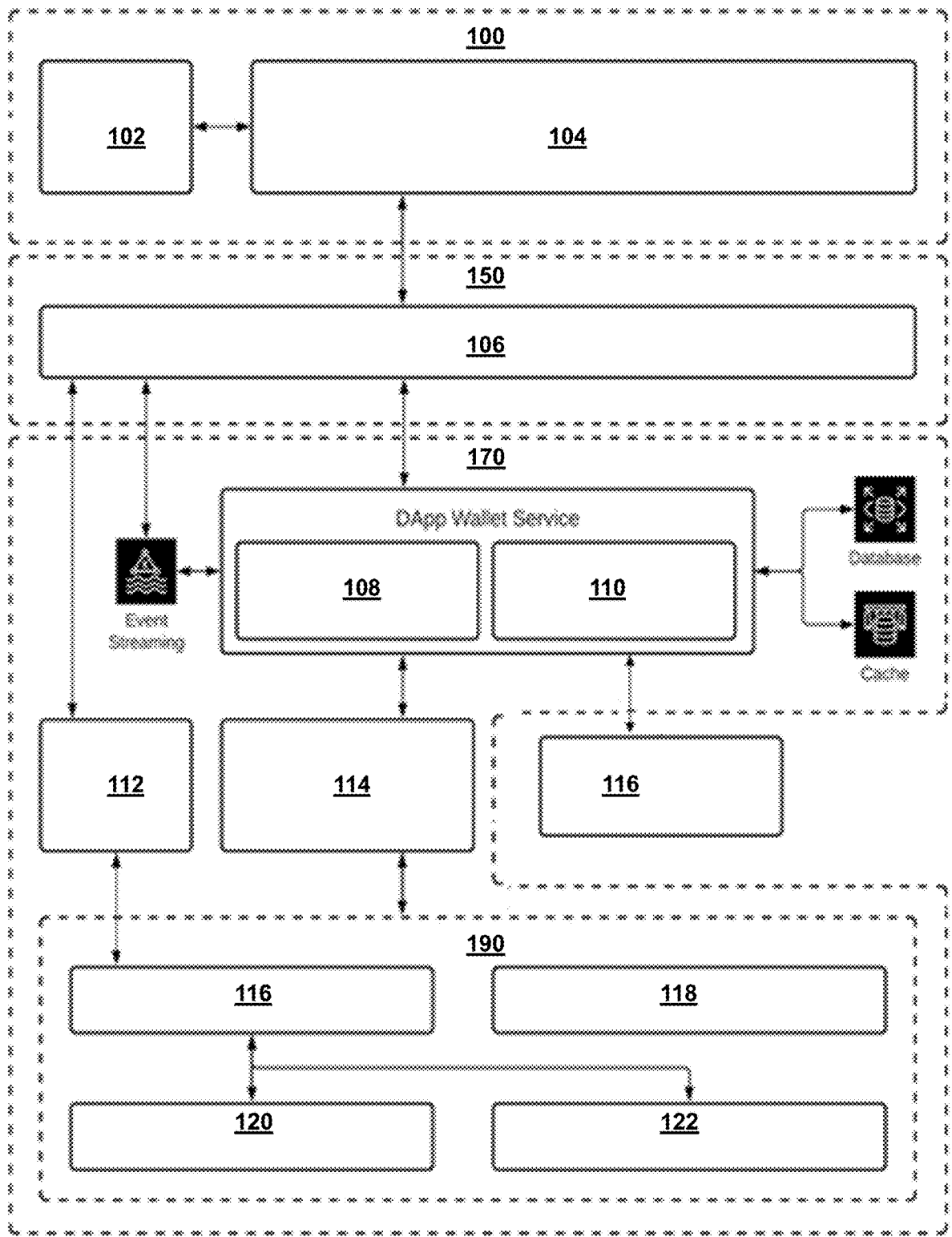
FIG. 1 shows an illustrative diagram for a decentralized application that may use a plurality of cryptography-based, storage applications with varying key structures to perform blockchain operations, in accordance with one or more embodiments.

FIG. 1 shows an illustrative diagram for a decentralized application that may use a plurality of cryptography-based, storage applications with varying key structures to perform blockchain operations, in accordance with one or more embodiments. For example, FIG. 1 may include user interface application 100. For example, user interface application 100 may be a retail application used to perform one or more blockchain operations at one or more decentralized applications. The system may receive user requests via a browser implemented in user interface application 100. User interface application 100 may include first component 102 (e.g., implemented on a user device) and second component 104 (e.g., implemented on a user device and/or remotely from the user device). First component 102 may comprise a mobile application, whereas second component 104 may provide backend operations for user interface application 100.

User interface application 100 may interact with platform services 150. For example, platform services 150 may be located remotely from a user device upon which user interface application 100 is implemented. Platform services 150 may provide one or more services to enable one or more features of user interface application 100. For example, platform services 150 may provide cloud computing services that allows users to provision, instantiate, run, and manage one or more applications, without the complexity of building and maintaining the infrastructure typically associated with developing and launching the applications. Platform services 150 also allow developers for the system to create, develop, and package software bundles used to facilitate one or more blockchain operations.

Platform services 150 may interact with cryptography services 170. Cryptography services 170 may include one or more sub-components that may interact with a blockchain and/or blockchain node to enable blockchain operations. For example, cryptography services 170 may include event streaming application 172, event database 174, and event cache 176. These sub-components may enable digital wallet service 106. Digital wallet service 106 may include a blockchain-specific wallet (e.g., blockchain wallet 108) and an indexing service (e.g., blockchain indexer 110). Digital wallet service 106 may communicate (e.g., via encrypted communications) to blockchain node 116. For example, blockchain node 116 may comprise a remote device that belongs to a blockchain network of devices.

Digital wallet service 106 may communicate with keychain service 114. Keychain services 114 may provide access to private keys and their corresponding certificate chains in credential storage. Cryptography services 170 may also include device manager 112. Device manager 112 may provide authentication services for one or more user services. Keychain services 114 and device manager 112 may interact with signing application 190. Signing application 190 may comprise multi-party computation application 116, which may provide multiple parties—each holding their own private data—to evaluate a computation without ever revealing any of the private data held by each party. For example, multi-party computation application 116 may ensure that private information held by the parties cannot be inferred from the execution of the protocol. Additionally, or alternatively, multi-party computation application 116 may ensure that if a number of parties within the group decide to share information or deviate from the instructions during the protocol execution, the multi-party computation application 116 will not allow them to force the honest parties to output an incorrect result or leak an honest party's secret information.

Signing application 190 may also include automation services 118, which may facilitate the digital signing process as a well as cloud storage 120 and escrow service 112. For example, escrow service 112 may store a recovery key for a user account (e.g., a key that allows a user to be provided with a partial private key).

Figure 2:
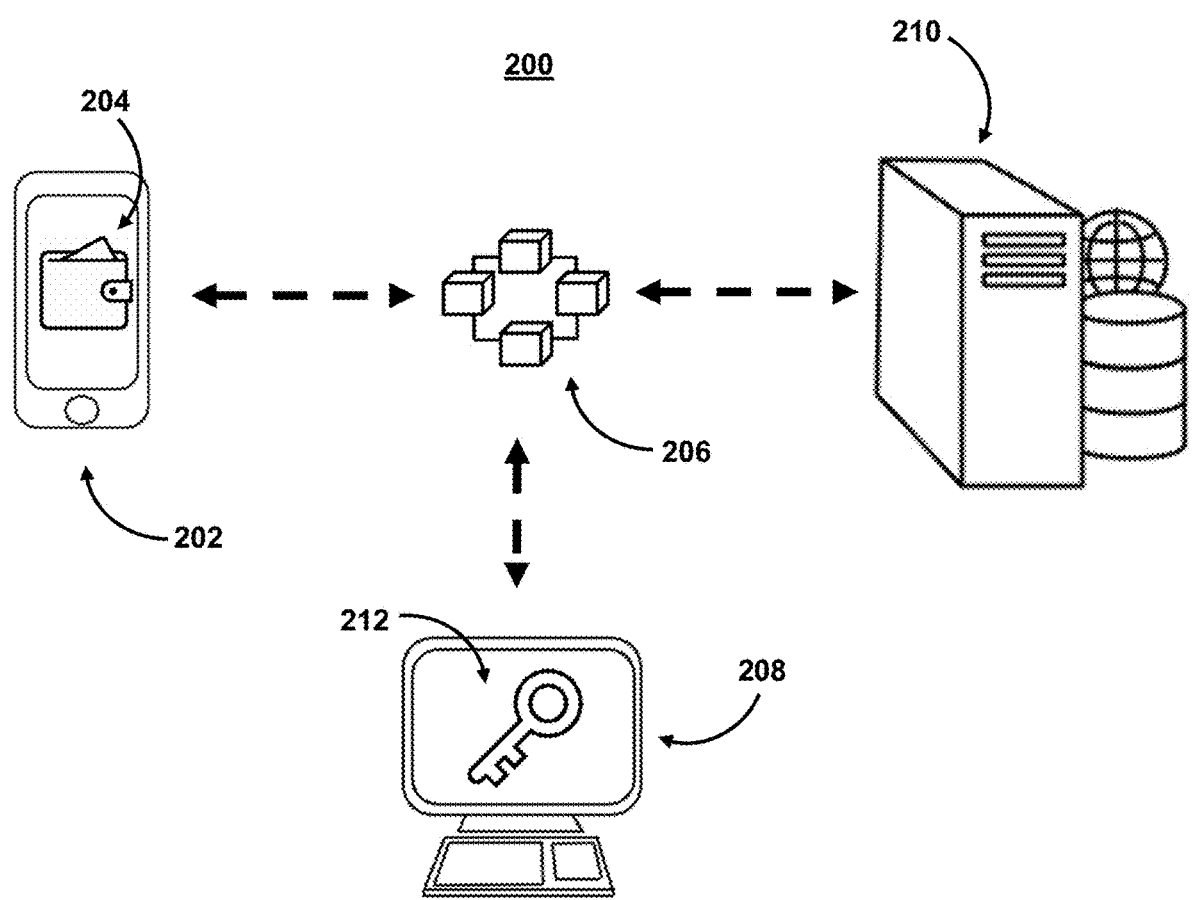
FIG. 2 shows an illustrative diagram for conducting blockchain operations, in accordance with one or more embodiments.

FIG. 2 shows an illustrative diagram for conducting blockchain operations, in accordance with one or more embodiments. For example, the diagram presents various components that may be used to link cryptography-based digital repositories and/or facilitate secure blockchain operations in some embodiments. FIG. 2 includes user device 202. User device 202 may include a user interface. As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to link cryptography-based digital repositories and/or facilitate secure blockchain operations, and the user interface may display content related to linking cryptography-based digital repositories and/or facilitating secure blockchain operations. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules, and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually.

Each of the user devices may be used by the system to conduct blockchain operations and/or contribute to link cryptography-based digital repositories and/or facilitate secure blockchain operations. As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital asset-specific blockchain), including a nonfungible token. A nonfungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

As shown in FIG. 2, one or more user devices may include a digital wallet (e.g., digital wallet 204) used to perform blockchain operations. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets such as hot wallets and cold wallets. Hot wallets are connected to the Internet while cold wallets are not. Most digital wallet holders hold both a hot wallet and a cold wallet. Hot wallets are most often used to perform blockchain operations, while a cold wallet is generally used for managing a user account and may have no connection to the Internet.

As shown in FIG. 2, one or more user devices may include a private key (e.g., key 212) and/or digital signature. For example, system 200 may use cryptographic systems for conducting blockchain operations such as linking cryptography-based digital repositories and/or facilitating secure blockchain operations. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that it is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding it to the blockchain. System 200 may add the blockchain operation to blockchain 206. System 200 may perform this based on a consensus of the user devices within system 200. For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that it performed computational work to validate a blockchain operation and thus this mechanism provides a manner for achieving consensus in a decentralized manner as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively, or additionally, system 200 may use a proof-of-stake mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

Figure 3:
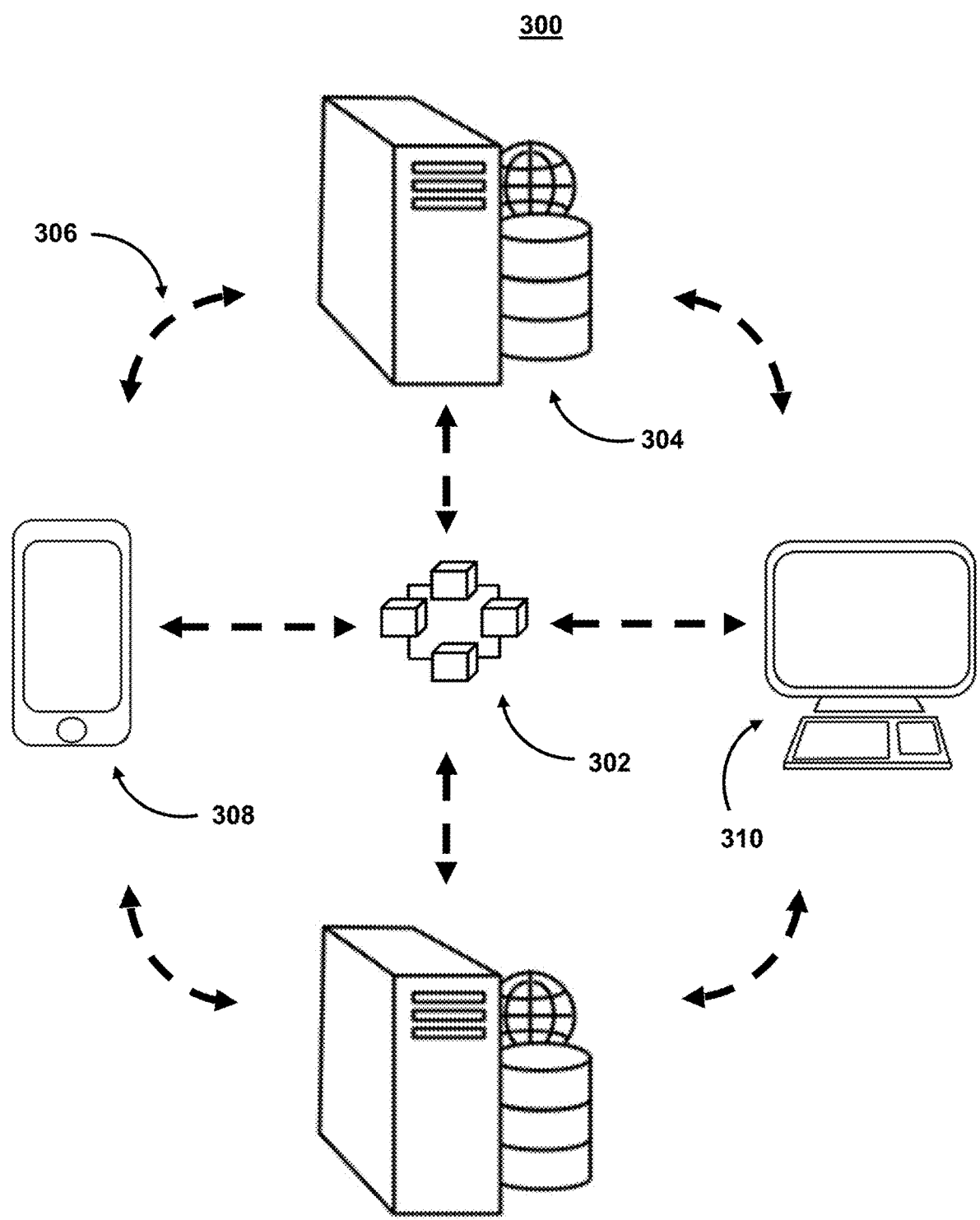
FIG. 3 shows an illustrative diagram for a decentralized application, in accordance with one or more embodiments.

FIG. 3 shows an illustrative diagram for a decentralized application, in accordance with one or more embodiments. For example, in some embodiments, system 300 may link cryptography-based digital repositories and/or facilitate secure blockchain operations within a decentralized application environment. A decentralized application may comprise an application that exists on a blockchain (e.g., blockchain 302) and/or a peer-to-peer network (e.g., network 306). That is, a decentralized application may comprise an application that has a back end that is in part powered by a decentralized peer-to-peer network such as a decentralized, open-source blockchain with smart contract functionality.

For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network, without the need of any intermediaries or central authorities.

In some embodiments, the user devices of system 300 may comprise one or more cloud components. For example, cloud components may be implemented as a cloud computing system and may feature one or more component devices. It should also be noted that system 300 is not limited to four devices. Users may, for instance, utilize one or more devices to interact with one another, one or more servers, or other components of system 300. It should be further noted that while one or more operations (e.g., blockchain operations) are described herein as being performed by a particular component (e.g., user device 304) of system 300, those operations may, in some embodiments, be performed by other components of system 300. As an example, while one or more operations are described herein as being performed by components of user device 304, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 304 and user device 308, respectively). Additionally, or alternatively, a single user (and/or a user account linked to a single user) may interact with system 300 and/or one or more components of system 300 using two different components (e.g., user device 304 and user device 308, respectively).

With respect to the components of system 300, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 308 and user device 310 include a display upon which to display data (e.g., content related to one or more blockchain operations).

Additionally, the devices in system 300 may run an application (or another suitable program). The application may cause the processors and/or control circuitry to perform operations related to linking cryptography-based digital repositories and/or facilitating secure blockchain operations within a decentralized application environment.

Each of these devices may also include electronic storages. The electronic storages may include non-transitory storage media that electronically store information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes network 306, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 4:
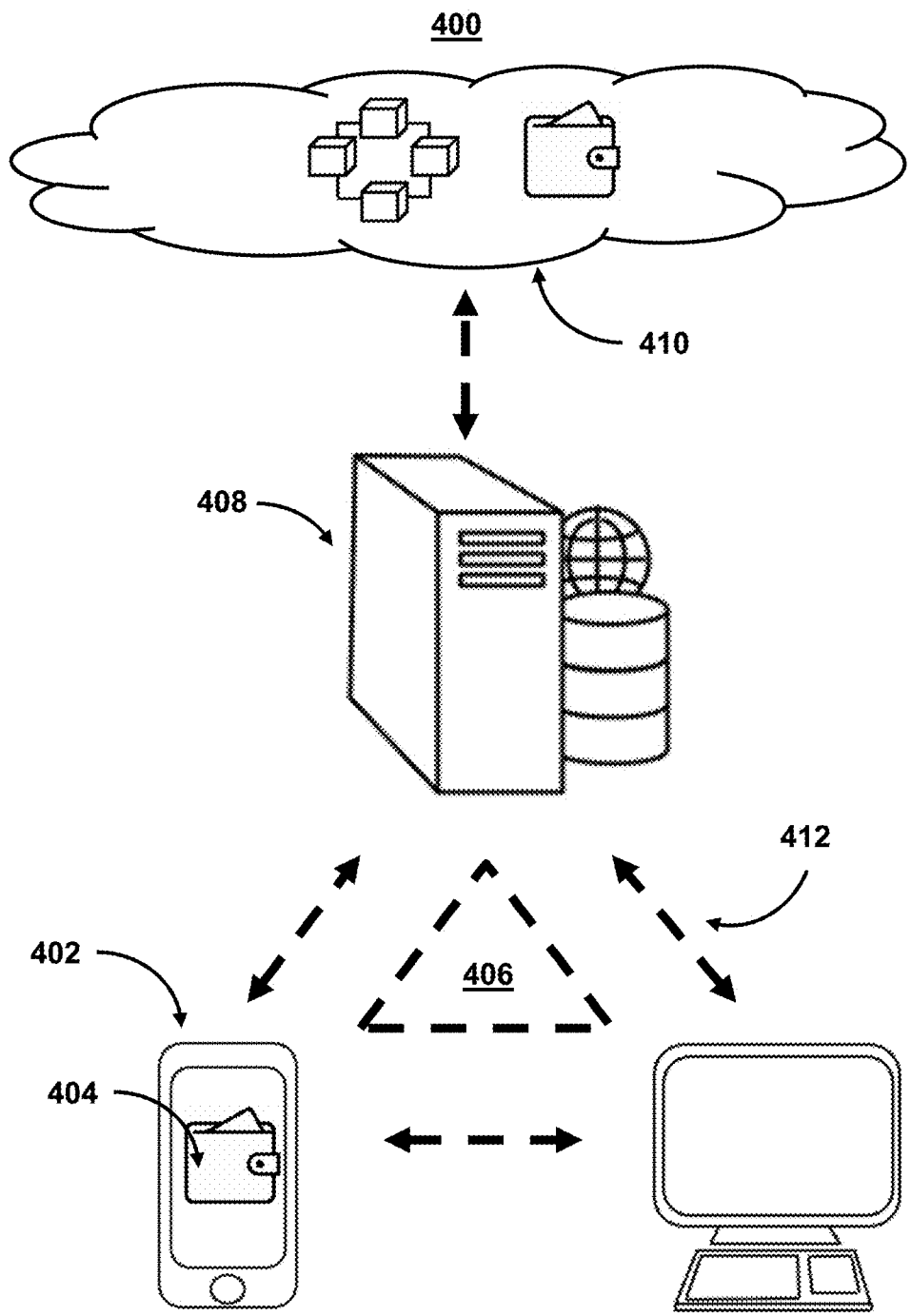
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or application programming interfaces (APIs) in order to link cryptography-based digital repositories and/or facilitate secure blockchain operations. For example, application 404 may comprise a decentralized application digital wallet and/or wallet service that is able to sign and send transactions to transfer tokens and/or perform other blockchain operations as well as interact with one or more decentralized applications.

System 400 also includes API layer 406. In some embodiments, API layer 406 may be implemented on user device 402. Alternatively, or additionally, API layer 406 may reside on one or more cloud components (e.g., server 408). For example, API layer 406 may reside on a server 408 and comprise a platform service for a custodial wallet service, decentralized application, etc. API layer 406 (which may be a REST or web services API layer) may provide a decoupled interface to data and/or functionality of one or more applications.

API layer 406 may provide various low-level and/or blockchain-specific operations in order to link cryptography-based digital repositories and/or facilitate secure blockchain operations. For example, API layer 406 may provide blockchain operations such as blockchain writes. Furthermore, API layer 406 may perform a transfer validation ahead of forwarding the blockchain operation (e.g., a transaction) to another service (e.g., a crypto service). API layer 406 may then log the outcome. For example, by logging to the blockchain prior to forwarding, the API layer 406 may maintain internal records and balances without relying on external verification (e.g., which may take up to ten minutes based on blockchain updating activity).

API layer 406 may also provide informational reads. For example, API layer 406 (or a platform service powered by API layer 406) may generate blockchain operation logs and write to an additional ledger (e.g., an internal record and/or indexer service) the outcome of the reads. If this is done, a user accessing the information through other means may see consistent information such that downstream users ingest the same data point as the user.

API layer 406 may also provide a unified API to access balances, transaction histories, and/or other blockchain operations activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

API layer 406 may provide a common, language-agnostic way of interacting with an application. In some embodiments, API layer 406 may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. SOAP web services have traditionally been adopted in the enterprise for publishing internal services as well as for exchanging information with partners in business-to-business (B2B) transactions.

API layer 406 may use various architectural arrangements. For example, system 400 may be partially based on API layer 406, such that there is strong adoption of SOAP and RESTful web services, using resources such as Service Repository and Developer Portal, but with low governance, standardization, and separation of concerns. Alternatively, system 400 may be fully based on API layer 406, such that separation of concerns between layers such as API layer 406, services, and applications are in place.

In some embodiments, the system architecture may use a microservice approach. Such systems may use two types of layers: front-end layers and back-end layers, where microservices reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized application environment. In some embodiments, the system architecture may use an open API approach. In such cases, API layer 406 may use commercial or open-source API platforms and their modules. API layer 406 may use a developer portal. API layer 406 may use strong security constraints applying a web application firewall that protects the decentralized applications and/or API layer 406 against common web exploits, bots, and denial-of-service (DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410 (e.g., as described in FIG. 5), and/or other platform services.

For example, a wallet service may comprise an application and/or a software-based system that securely stores users' payment information, private keys, and/or passwords facilitating blockchain operations with websites, nodes, and/or other devices. In some embodiments, a wallet service may also provide additional ledger access (e.g., a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. While conventional systems may rely on directly referencing blockchain 410, since the blockchain is the source of truth for the system, however, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires additional processing and computational power.

Second, accounting changes in a blockchain architecture should be irreversible. This is achieved in practice for current blockchain operations by waiting for a variable number of confirmations from the blockchain (e.g., blockchain 410). By waiting for the variable number of confirmations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system—blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system 400 may have a more straightforward mechanism to maintain an accurate history of a user account's positions if system 400 stores them independently from a given blockchain. Furthermore, in case of forks, system 400 performs some internal remediation on user accounts, which is enabled by system 400 maintaining a layer of insulation, from the blockchain, for remedial blockchain operations. For example, system 400 may have a separate storage, protected by the second ledger (e.g., a ledger service), for reads, and by a transfer service, for writes, that reflect the state of the blockchain that is relevant for system 400 purposes.

In some embodiments, the system may also use one or more Application Binary Interfaces (ABIs). An ABI is an interface between two program modules, often between operating systems and user programs. ABIs may be specific to a blockchain protocol. For example, an Ethereum Virtual Machine (EVM) is a core component of the Ethereum network, and a smart contract may be a piece of code stored on the Ethereum blockchain, which is executed on EVM. Smart contracts written in high-level languages like Solidity or Vyper may be compiled in EVM executable bytecode by the system. Upon deployment of the smart contract, the bytecode is stored on the blockchain and is associated with an address. To access functions defined in high-level languages, the system translates names and arguments into byte representations for byte code to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parseable format, doing translations between human-intended method calls and smart-contract operations discoverable and reliable.

For example, ABI defines the methods and structures used to interact with the binary contract similar to an API, but on a lower-level. The ABI indicates the caller of the function to encode (e.g., ABI encoding) the needed information like function signatures and variable declarations in a format that the EVM can understand to call that function in bytecode. ABI encoding may be automated by the system using compilers or wallets interacting with the blockchain.

Figure 5:
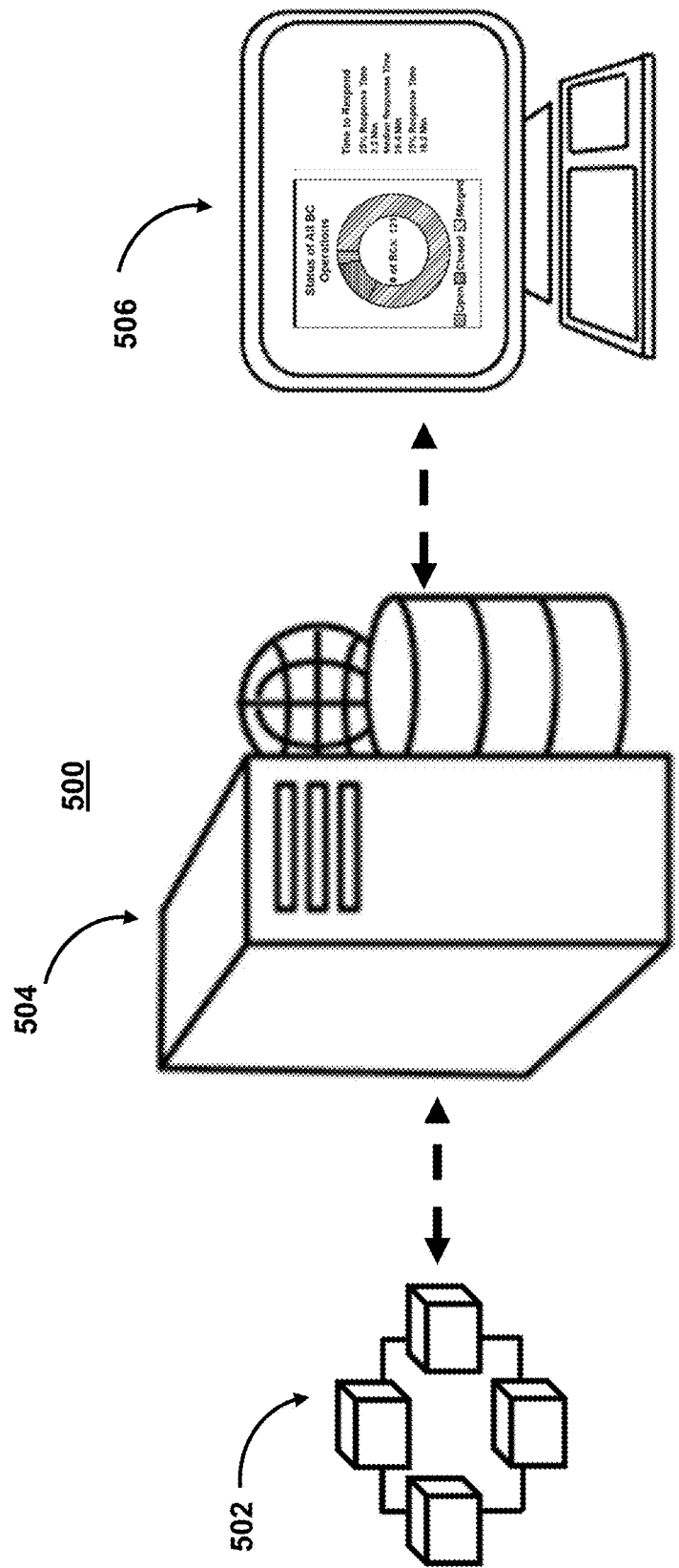
FIG. 5 shows an illustrative diagram for a blockchain indexer, in accordance with one or more embodiments.

FIG. 5 shows an illustrative diagram for a blockchain indexer, in accordance with one or more embodiments. For example, in some embodiments, the system may use indexer service 500 to facilitate secure blockchain operations. Indexer service 500 may fetch raw data (e.g., data related to a current state and/or instance of blockchain 502) from a node of a blockchain network (e.g., as described above). Indexer service 500 may then process the data and store it in a database and/or data structure in an efficient way to provide quick access to the data. For example, indexer 504 may publish and/or record a subset of blockchain operations that occur for blockchain 502. Accordingly, for subsequent blockchain operations, indexer service 500 may reference the index at indexer 504 as opposed to a node of blockchain 502 to provide various services at user device 506.

For example, indexer 504 may store a predetermined list of blockchain operations to monitor for and/or record in an index. These may include blockchain operations (e.g., "operation included," "operation removed," "operation finalized") related to a given type of blockchain operation (e.g., "transaction," "external transfer," "internal transfer," "new contract metadata," "ownership change," etc.) as well as blockchain operations related to a given protocol, protocol subgroup, and/or other characteristic (e.g., "ETH," "ERC20," and/or "ERC721"). Additionally, and/or alternatively, the various blockchain operations and metadata related to those blockchain operations (e.g., block designations, user accounts, time stamps, etc.) as well as an aggregate of multiple blockchain operations (e.g., total blockchain operations amounts, rates of blockchain operations, rate of blockchain updates, etc.) may be monitored and/or recorded.

Indexer 504 may likewise provide navigation and search features (e.g., support Boolean operations) for the indexed blockchain operations. In some embodiments, indexer 504 may apply one or more formatting protocols to generate representations of indexed blockchain operations in a human-readable format. In some embodiments, indexer 504 may also tag blockchain operations based on whether or not the blockchain operation originated for a local user account (e.g., a user account corresponding to a custodial account) and/or a locally hosted digital wallet. Indexer service 500 may determine whether a blockchain operation contains relevant information for users of indexer service 500 by storing information about whether an address is an internal address of indexer service 500 or one used in a digital wallet hosted by a predetermined wallet service.

Figure 6:
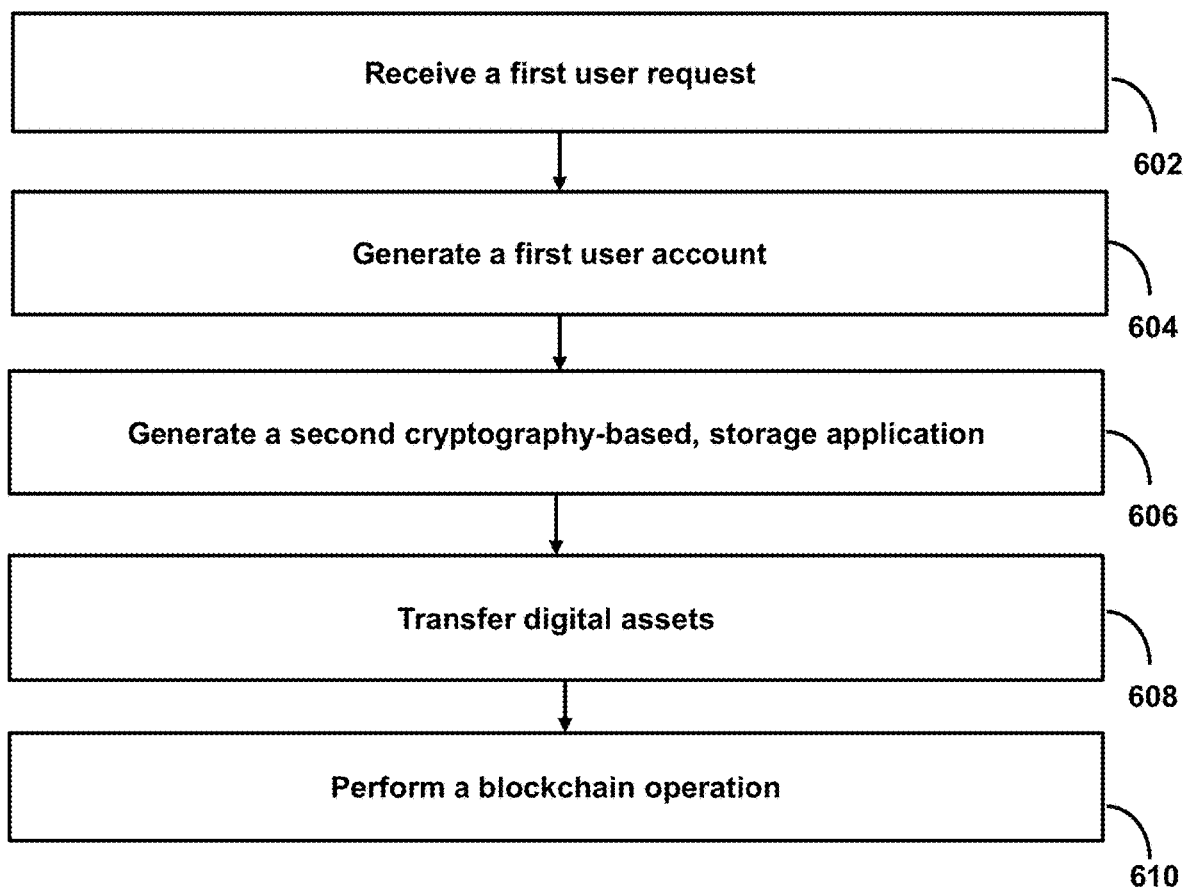
FIG. 6 shows a flowchart of the steps involved in linking cryptography-based digital repositories in order to perform blockchain operations in decentralized applications, in accordance with one or more embodiments.

FIG. 6 shows a flowchart of the steps involved for maintaining secure, encrypted communications across distributed computer networks by linking cryptography-based digital repositories in order to perform blockchain operations in decentralized applications, in accordance with one or more embodiments. For example, the system may use process 600 (e.g., as implemented on one or more system components described above) in order to provide secure, encrypted communications to perform blockchain operations.

For example, cryptography-based digital repositories or a cryptography-based, storage application may refer to a digital wallet. A digital wallet may comprise a software-based system that securely (and typically in an encrypted format) stores users, confidential information, personal information, payment information, and/or passwords for numerous payment methods and websites. By using a digital wallet, users can complete communications, purchases, and/or other blockchain operations easily and securely without risking the information becoming public or subject to a cyber-attack.

At step 602, process 600 (e.g., using one or more components described above) may receive a first user request. For example, the system may receive, at a first user interface for a decentralized application browser, a first user request. For example, the first user request may request creation of a first user account for the decentralized application browser. As another example, the decentralized application browser may perform a plurality of blockchain operations for digital assets stored in a first cryptography-based, storage application. The first cryptography-based, storage application may correspond to a first private key, and the first private key may be stored on a first user device. For example, in some embodiments, the decentralized application browser may be implemented on a user device.

For example, the first cryptography-based, storage application may be a non-custodial cryptography-based, storage application. That is, the first cryptography-based, storage application may be a separate, standalone application that allows users to store, or maintain custody of, their own crypto, and explore the decentralized web with a decentralized application browser. The first cryptography-based, storage application may be a standalone application that does not require interaction with a user account (e.g., an account from a blockchain services provider, centralized brokerage, and/or exchange). The first cryptography-based, storage application may allow users to manage their own private keys and store their crypto assets directly on their devices, not with a centralized brokerage or exchange.

In some embodiments, a status of the digital assets may be received. For example, the system may receive a second user request at the first user interface browser. For example, the second user request may request a status of the digital assets. The system may then, in response to the second user request, query a blockchain indexer for the decentralized application browser for blockchain operations related to the digital assets. For example, the system may allow users to perform numerous blockchain operations, including allowing users to fetch information from a specific blockchain (and/or of a specific type of protocol, operations, etc.) pertaining to a user account. This may include operations such as retrieving account balances of all ERC20 and ERC721 tokens, as well as submitting transactions.

At step 604, process 600 (e.g., using one or more components described above) may generate a first user account. For example, the system may, in response to the first user request, generate the first user account. For example, in some embodiments, an application programming interface ("API") implemented on a remote device may generate the first user account in response to the first user request.

At step 606, process 600 (e.g., using one or more components described above) may generate a second cryptography-based, storage application. For example, the system may, in response to generating the first user account, generate a second cryptography-based, storage application. For example, the second cryptography-based, storage application may correspond to a first partial private key and a second partial private key. The first partial private key may be stored on a first remote device, and the second partial private key may be stored on the first user device. In some embodiments, the API (e.g., implemented on the remote device) may generate the second cryptography-based storage application in response to generating the first user account.

For example, the second cryptography-based, storage application may be a custodial or semi-custodial cryptography-based, storage application. That is, the second cryptography-based, storage application may be a separate, stand-alone application that allows users to store, or maintain custody of, their own crypto, and explore the decentralized web with a decentralized application browser through an application provided by a blockchain services provider, centralized brokerage, and/or exchange. The second cryptography-based, storage application may be an application that requires interaction with a user account from a blockchain services provider, centralized brokerage, and/or exchange. The second cryptography-based, storage application may allow users to have their private keys managed by the blockchain services provider, centralized brokerage, and/or exchange without storing their own private keys (at least completely) and crypto assets directly on their devices.

In some embodiments, generating the first user account may comprise generating an address for the second cryptography-based, storage application. For example, the system may receive a first text string corresponding to a username. The system may then select a pool array based on an input of a pool array identification. The system may then generate an address for the second cryptography-based, storage application based on the first text string and the pool array. For example, the system may receive a request to create an account for a user with 'user_id' and with an optional 'pool id.' If the pool id is not specified, the system may use the configured default 'pool.' The system may then use an allocation configuration to name the user account after the user. The system also creates the new blockchain wallet and returns a blockchain address (e.g., 40 hexadecimal characters), which is also the wallet ID.

In some embodiments, generating the first user account may comprise generating a wallet identification for the second cryptography-based, storage application. For example, the system may generate an address for the second cryptography-based, storage application comprising a text string of hexadecimal characters. The system may then generate a wallet identification, for the decentralized application browser, for the second cryptography-based, storage application based on the address.

At step 608, process 600 (e.g., using one or more components described above) may transfer digital assets. For example, the system may transfer the digital assets to the second cryptography-based, storage application. In some embodiments, the API (e.g., implemented on a remote device) may transfer the digital assets to the second cryptography-based, storage application.

In some embodiments, transferring the digital assets to the second cryptography-based, storage application may comprise generating an instruction to transfer the digital assets. For example, the system may, in response to generating the second cryptography-based, storage application, determine a threshold digital asset amount for the second cryptography-based, storage application. The system may then generate an instruction to automatically transfer the threshold digital asset amount from the first cryptography-based, storage application to the second cryptography-based, storage application. For example, the system may make a request instructing the system to withdraw the threshold amount from the first cryptography-based, storage application (e.g., based on a user ID) and send the threshold amount to the newly created address corresponding to the second cryptography-based, storage application. Additionally, or alternatively, the system may automatically record the blockchain operation on the blockchain index.

At step 610, process 600 (e.g., using one or more components described above) may perform a blockchain operation. For example, the system may perform, using the decentralized application browser, a blockchain operation of the plurality of blockchain operations with the digital assets. In some embodiments, the API (e.g., implemented on the remote device) may perform the blockchain operation of the plurality of blockchain operations with the digital assets.

In some embodiments, performing the blockchain operation may comprise retrieving data related to a contract state. For example, the system may receive, at the first user interface, a third user request. The third user request may request performance of the blockchain operation, and the blockchain operation may be a request to read a contract state. The system may then, in response to the third user request, retrieve data related to the contract state from a blockchain node.

For example, system may comprise a custodial wallet service for the second cryptography-based, storage application. The wallet service may be responsible for reading and writing states to the blockchain per user request. For example, the system may monitor for GRPC requests requesting to read contract states or write transactions. The system may then either retrieve data from a blockchain (e.g., Ethereum) node using JSON-RPC in the read case or build a transaction, using a particular user's private key, and submit the transaction to the blockchain node using JSON-RPC.

In some embodiments, retrieving data related to the contract state may comprise transmitting a call request to a blockchain node. For example, the system may determine, based on a database lookup, an address for the second cryptography-based, storage application. The system may then generate, based on a blockchain protocol, encoded data comprising a method name and parameter into binary data format. The system may then transmit a call request to the blockchain node with the encoded data. The system may then parse the data related to the contract state based on a response from the call request.

For example, the system may use one or more protocol specific to a blockchain to perform blockchain operations. The system may not show the user any information about other types of smart contracts (or other blockchain operations) in the user interface. As such, the standard Application Binary Interface (ABI) for ERC20 and ERC721 contracts may be saved internally, and GRPC endpoints may be exposed allowing callers to ask for any of the standard ERC20 and ERC721 contract methods. Upon receiving a request, containing a user_id, contract address, method name, and method parameters, the second cryptography-based, storage application may do the following, asynchronously. The system may look up a user's address in the database. The system may use Ethereum's ABI-encoding to translate the method name and parameters into a binary data format. The system may send an 'eth call' JSON-RPC request to an Ethereum node with the encoded data as a parameter. The system may wait for the response from the node. The system may parse and return the resulting data.

In some embodiments, performing the blockchain operation comprises submitting the blockchain operation to a blockchain node. For example, the system may receive, at the first user interface, a fourth user request. The fourth user request may request performance of the blockchain operation. For example, the blockchain operation may be a blockchain transaction. The system may then, in response to the fourth user request, generate, at the decentralized application browser, a digital signature based on the first partial private key and the second partial private key. In some embodiments, the API (e.g., implemented on the remote device) may generate the first digital signature based on the first partial private key and the second partial private key. The system may then sign the blockchain operation with the digital signature. The system may then submit the blockchain operation to a blockchain node.

In some embodiments, submitting the blockchain operation to the blockchain node may comprise determining a gas limit. For example, the system may determine, based on a database lookup, an address for the second cryptography-based, storage application. The system may then generate, based on a blockchain protocol, an unsigned transaction. The system may then determine a nonce value. The system may then determine a gas limit by simulating the blockchain transaction.

For example, submitting transactions and writing contract states may comprise the same operations depending on the blockchain protocol. Writing contract states may also include an encoded 'data' field indicating the contract method and parameters to call, which is parsed by nodes and miners for the blockchain. For example, the system may look up a second cryptography-based, storage application address in a database. The system may create an unsigned transaction out of input parameters, including: 'to' address; Eth 'value', optional gas price, or a slow/standard/fast enum mapper to current gas prices; optional pre-encoded calldata for contract methods; and a user account address (if not passed in). The system may determine the next nonce (e.g., the last known transaction's nonce+1 or number of confirmed transactions+number of pending transactions). Unless provided, the system may then determine the gas limit by simulating the transaction using eth_estimateGas. The gas limit will be the estimated gas usage+50% buffer by the system. The system may send the unsigned transaction to a digital signature singing process, along with the user_id, to create a signed transaction. Each user_id may be mapped to a unique "pool" and "private_key," as part of the account creation process. The system may receive a signed transaction hash from the digital signing process. The system may send the signed transaction hash to a blockchain node (e.g., using the 'eth_sendTransaction' method). Once the transaction is confirmed, the system may create a log event for publishing. The result of the transaction can then be queried (e.g., using the RPC methods getTransactionReceipt and GetTransactionByHash).

In some embodiments, a second user account may be generated. For example, the system may receive, at the first user interface, a fifth user request. For example, the fifth user request may request creation of a second user account for the decentralize application browser. The system may then, in response to the fifth user request, generate the second user account. The system may then, in response to generating the second user account, generate a third cryptography-based, storage application. For example, the third cryptography-based, storage application may correspond to a third partial private key and a fourth partial private key. The third partial private key may be stored on the first remote device, and the fourth partial private key may be stored on the first user device.

For example, in response to user requests, the system may generate new user accounts and a new address for each account. The system may allow users to have many accounts, each associated with a unique address. The system may then automatically or in response to user input fund the accounts with a threshold amount of digital assets from the first cryptography-based, storage application.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
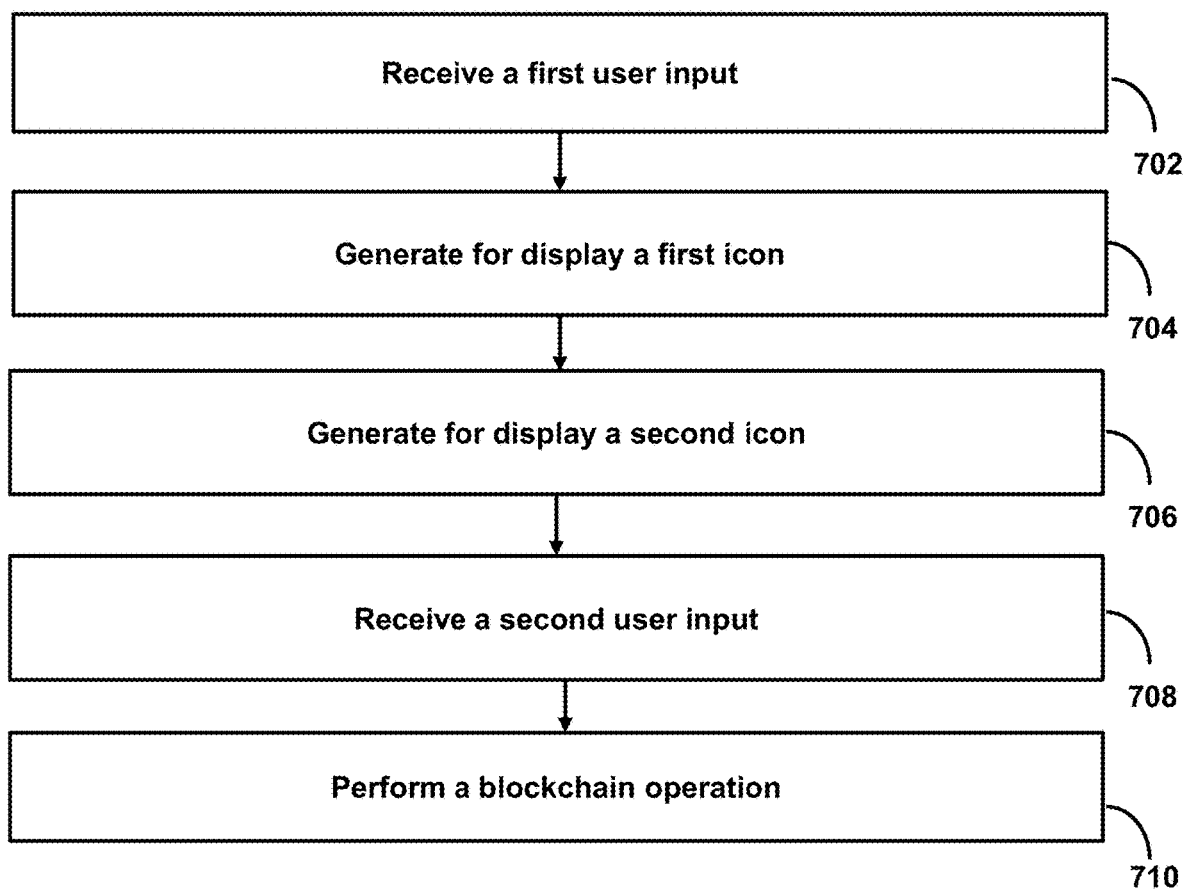
FIG. 7 shows a flowchart of the steps involved in facilitating secure blockchain operations in decentralized applications using cryptography-based, storage applications in computer networks, in accordance with one or more embodiments.

FIG. 7 shows a flowchart of the steps involved for facilitating secure blockchain operations in decentralized applications using cryptography-based, storage applications in computer networks, in accordance with one or more embodiments. For example, the system may use process 700 (e.g., as implemented on one or more system components described above) in order to provide a user interface.

For example, the system may provide a user interface that allows users to perform blockchain operations. The system may receive a user request or input to create a cryptography-based, storage application, which will generate a new blockchain-specific address for them. The system may allow users to have many cryptography-based, storage applications accounts, each associated with a unique address. Accordingly, the system may allow a use to budget and manage the balances in various accounts. Additionally, the system may allow users to easily use one cryptography-based, storage application while not exposing (and/or create security risks around) another cryptography-based, storage application.

At step 702, process 700 (e.g., using one or more components described above) may receive a first user input. For example, the system may receive, via a user interface on a user device, a first user input. For example, the first user input may request access to a user account on a decentralized application for performing a plurality of blockchain operations. In some embodiments, a decentralized application browser implemented on a user device may receive, via the user interface, the first user input.

At step 704, process 700 (e.g., using one or more components described above) may generate for display a first icon. For example, the system may, in response to the first user input, generate for display, in the user interface, a first icon. For example, the first icon may correspond to a first cryptography-based, storage application corresponding to the user account. The first cryptography-based, storage application may correspond to a first partial private key and a second partial private key. The first partial private key may be stored on a remote device, and the second partial private key may be stored on the user device. In some embodiments, the decentralized application browser (e.g., implemented on the user device) may generate for display, in the user interface, the first icon.

At step 706, process 700 (e.g., using one or more components described above) may generate for display a second icon. For example, in response to the first user input, the system may generate for display, in the user interface, a second icon. The second icon may correspond to a second cryptography-based, storage application corresponding to the user account. The second cryptography-based, storage application may correspond to a third partial private key and a fourth partial private key. The third partial private key may be stored on the remote device, and the fourth partial private key may be stored on the user device. In some embodiments, the decentralized application browser (e.g., implemented on the user device) may generate for display, in the user interface, the second icon.

For example, the first and second cryptography-based, storage applications may be custodial or semi-custodial cryptography-based, storage applications. That is, the first and second cryptography-based, storage applications may be separate, standalone applications that allow users to store, or maintain custody of, their own crypto, and explore the decentralized web with a decentralized application browser through an application provided by a blockchain services provider, centralized brokerage, and/or exchange. The first and second cryptography-based, storage applications may be applications that require interaction with a user account from a blockchain services provider, centralized brokerage, and/or exchange. The first and second cryptography-based, storage applications may allow users to have their private keys managed by the blockchain services provider, centralized brokerage, and/or exchange without storing their own private keys (at least completely) and crypto assets directly on their devices. Despite the first and second cryptography-based, storage applications being standalone applications, the system may access (and allow a user to perform blockchain operations using), the first and second cryptography-based, storage applications.

In some embodiments, a third icon may be generated. For example, the system may generate for display, in the user interface, a third icon. For example, the third icon may correspond to a third cryptography-based, storage application corresponding to the user account. For example, the third cryptography-based, storage application may correspond to a first private key, and the first private key may be stored on the user device.

For example, a third first cryptography-based, storage application may be a non-custodial cryptography-based, storage application. That is, the third cryptography-based, storage application may be a separate, standalone application that allows users to store, or maintain custody of, their own crypto, and explore the decentralized web with a decentralized application browser. The third cryptography-based, storage application may be a standalone application that does not require interaction with a user account (e.g., an account from a blockchain services provider, centralized brokerage, and/or exchange). The third cryptography-based, storage application may allow users to manage their own private keys and store their crypto assets directly on their devices, not with a centralized brokerage or exchange. Despite the third cryptography-based, storage application being a standalone application, the system may access (and allow a user to perform blockchain operations using) the third cryptography-based, storage application.

At step 708, process 700 (e.g., using one or more components described above) may receive a second user input. For example, the system may receive, via the user interface on the user device, a second user input. For example, the second user input may select the first icon for performing a blockchain operation of the plurality of blockchain operations. In some embodiments, the decentralized application (e.g., implemented on the user device) may receive, via the user interface on the user device, the second user input.

At step 710, process 700 (e.g., using one or more components described above) may perform a blockchain operation. For example, the system may, in response to the second user input, perform the blockchain operation using the first cryptography-based, storage application. In some embodiments, performing the blockchain operation may comprise retrieving data related to a contract state. For example, the system may determine that the blockchain operation corresponds to a request to read a contract state. The system may then, in response to determining that the blockchain operation corresponds to the request to read the contract state, retrieve data related to the contract state from a blockchain node.

For example, system may comprise a custodial wallet service for the second cryptography-based, storage application. The wallet service may be responsible for reading and writing states to the blockchain per user request. For example, the system may monitor for GRPC requests requesting to read contract states or write transactions. The system may then either retrieve data from a blockchain (e.g., Ethereum) node using JSON-RPC in the read case or build a transaction, using a particular user's private key, and submit the transaction to the blockchain node using JSON-RPC.

In some embodiments, retrieving data related to the contract state may comprise transmitting a call request to the blockchain node. For example, the system may determine, based on a database lookup, an address for the second cryptography-based, storage application. The system may then generate, based on a blockchain protocol, encoded data comprising a method name and parameter into binary data format. The system may then transmit a call request to the blockchain node with the encoded data. The system may then parse the data related to the contract state based on a response from the call request.

For example, the system may use one or more protocol specific to a blockchain to perform blockchain operations. The system may not show the user any information about other types of smart contracts (or other blockchain operations) in the user interface. As such, the standard Application Binary Interface (ABI) for ERC20 and ERC721 contracts may be saved internally, and GRPC endpoints may be exposed allowing callers to ask for any of the standard ERC20 and ERC721 contract methods. Upon receiving a request, containing a user_id, contract address, method name, and method parameters, the second cryptography-based, storage application may do the following, asynchronously. The system may look up a user's address in the database. The system may use Ethereum's ABI-encoding to translate the method name and parameters into a binary data format. The system may send an 'eth_call' JSON-RPC request to an Ethereum node with the encoded data as a parameter. The system may wait for the response from the node. The system may parse and return the resulting data.

In some embodiments, performing the blockchain operation comprises submitting the blockchain operation to a blockchain node. For example, the system may determine that the blockchain operation corresponds to a blockchain transaction. The system may then, in response to determining that the blockchain operation corresponds to the blockchain transaction, generate a digital signature based on the first partial private key and the second partial private key. For example, in some embodiments, the API (e.g., implemented on the remote device) may generate the first digital signature based on the first partial private key and the second partial private key. The system may then sign the blockchain operation with the digital signature. The system may then submit the blockchain operation to a blockchain node. In some embodiments, the API (e.g., implemented on the remote device) may perform the blockchain transaction based on the digital signature.

In some embodiments, submitting the blockchain operation to the blockchain node may comprise determining a gas limit. For example, the system may determine, based on a database lookup, an address for the first cryptography-based, storage application. The system may then generate, based on a blockchain protocol, an unsigned transaction. The system may then determine a nonce value. The system may then determine a gas limit by simulating the blockchain transaction.

For example, submitting transactions and writing contract states may comprise the same operations depending on the blockchain protocol. Writing contract states may also include an encoded 'data' field indicating the contract method and parameters to call, which is parsed by nodes and miners for the blockchain. For example, the system may look up a second cryptography-based, storage application address in a database. The system may create an unsigned transaction out of input parameters, including: 'to' address; Eth 'value', optional gas price, or a slow/standard/fast enum mapper to current gas prices; optional pre-encoded calldata for contract methods; a user account address (if not passed in). The system may determine the next nonce (e.g., the last known transaction's nonce+1 or number of confirmed transactions+number of pending transactions). Unless provided, the system may then determine the gas limit by simulating the transaction using eth_estimateGas. The gas limit will be the estimated gas usage+50% buffer by the system. The system may send the unsigned transaction to a digital signature signing process, along with the user_id, to create a signed transaction. Each user_id may be mapped to a unique "pool" and "private_key", as part of the account creation process. The system may receive a signed transaction hash from the digital signing process. The system may send the signed transaction hash to a blockchain node (e.g., using the 'eth_sendTransaction' method). Once the transaction is confirmed, the system may create a log event for publishing. The result of the transaction can then be queried (e.g., using the RPC methods getTransactionReceipt and GetTransactionByHash).

In some embodiments, a blockchain operation may be performed using the second cryptography-based, storage application. For example, in some embodiments, the system may receive, via the user interface on the user device, a third user input. For example, the third user input may select the second icon for performing the blockchain operation of the plurality of blockchain operations. The system may then, in response to the third user input, perform the blockchain operation using the second cryptography-based, storage application.

In some embodiments, a recommendation to perform an additional blockchain operation may be generated for display. For example, the system may receive, via the user interface on the user device, a fourth user input. For example, the fourth user input may select the first icon for performing an additional blockchain operation of the plurality of blockchain operations. The system may then determine a characteristic of the first cryptography-based, storage application and a characteristic of the additional blockchain operation. The system may then compare the characteristic of the first cryptography-based, storage application and the characteristic of the additional blockchain operation. The system may then, in response to determining that the characteristic of the first cryptography-based, storage application and the characteristic of the additional blockchain operation do not correspond, automatically determining a characteristic of the second cryptography-based, storage application. The system may then compare the characteristic of the second cryptography-based, storage application and the characteristic of the additional blockchain operation. The system may then, in response to determining that the characteristic of the second cryptography-based, storage application and the characteristic of the additional blockchain operation do correspond, generating for display, the user interface on the user device, a recommendation. For example, the recommendation may be to perform the additional blockchain operation using the second cryptography-based, storage application.

For example, the system may provide additional services to aid a user in performing blockchain operations. In some embodiments, the system may monitor characteristics related to a blockchain operation and provide recommendations to the user. For example, the system may monitor characteristics of a user account (e.g., a balance in a cryptography-based, storage application), characteristics of a specific blockchain operations (e.g., whether an intended transaction recipient has a likelihood of fraudulent activity), characteristics of a blockchain protocol (e.g., rules related to the blockchain protocol).

In some embodiments, an instruction to automatically transfer a threshold digital asset amount may be generated. For example, the system may determine a threshold digital asset amount for the first cryptography-based, storage application. The system may then generate an instruction to automatically transfer the threshold digital asset amount from the second cryptography-based, storage application to the first cryptography-based, storage application.

In some embodiments, a blockchain indexer may be queried for the decentralized application. For example, the system may receive a fifth user input at the user interface. For example, the fifth user input may request a status of digital assets for the first cryptography-based, storage application and the second cryptography-based, storage application. The system may then, in response to the second user request, query a blockchain indexer for the decentralized application for blockchain operations related to the digital assets for the first cryptography-based, storage application and the second cryptography-based, storage application, simultaneously. For example, the system may allow users to perform blockchain operations and/or manage their cryptography-based, storage applications using aggregated operations.

It is contemplated that the steps or descriptions of FIG. 7 may be used with any other embodiment of this disclosure. In addition, the steps and descriptions described in relation to FIG. 7 may be done in alternative orders or in parallel to further the purpose of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

A1. A method, the method comprising: receiving, at a first user interface for a decentralized application browser, a first user request, wherein the first user request requests creation of a first user account for the decentralized application browser, wherein the decentralized application browser performs a plurality of blockchain operations for digital assets stored in a first cryptography-based, storage application, wherein the first cryptography-based, storage application corresponds to a first private key, and wherein the first private key is stored on a first user device; in response to the first user request, generating the first user account; in response to generating the first user account, generating a second cryptography-based, storage application, wherein the second cryptography-based, storage application corresponds to a first partial private key and a second partial private key, wherein the first partial private key is stored on a first remote device, and wherein the second partial private key is stored on the first user device; transferring the digital assets to the second cryptography-based, storage application; and performing, using the decentralized application browser, a blockchain operation of the plurality of blockchain operations with the digital assets.

A2. The method of embodiment A1, further comprising: receiving a second user request, at the first user interface browser, wherein the second user request requests a status of the digital assets; and in response to the second user request, querying a blockchain indexer for the decentralized application browser for blockchain operations related to the digital assets.

A3. The method of any of embodiments A1-A2, wherein generating the first user account comprises: receiving a first text string corresponding to a user name; selecting a pool array based on an input of a pool array identification; generating an address for the second cryptography-based, storage application based on the first text string and the pool array.

A4. The method of any of embodiments A1-A3, wherein generating the first user account comprises: generating an address for the second cryptography-based, storage application comprising a text string of hexadecimal characters; generating a wallet identification, for the decentralized application browser, for the second cryptography-based, storage application based on the address.

A5. The method of any of embodiments A1-A4, wherein performing the blockchain operation comprises: receiving, at the first user interface, a third user request, wherein the third user request requests performance of the blockchain operation, and wherein the blockchain operation is a request to read a contract state; and in response to the third user request, retrieving data related to the contract state from a blockchain node.

A6. The method of any of embodiments A1-A5, wherein retrieving data related to the contract state from a blockchain node further comprises: determining, based on a database lookup, an address for the second cryptography-based, storage application; generating, based on a blockchain protocol, encoded data comprising a method name and parameter into a binary data format; transmitting a call request to the blockchain node with the encoded data; and parsing the data related to the contract state based on a response from the call request.

A7. The method of any of embodiments A1-A6, wherein performing the blockchain operation comprises: receiving, at the first user interface, a fourth user request, wherein the fourth user request requests performance of the blockchain operation, and wherein the blockchain operation is a blockchain transaction; and in response to the fourth user request, generating, at the decentralized application browser, a digital signature based on the first partial private key and the second partial private key; signing the blockchain operation with the digital signature; and submitting the blockchain operation to a blockchain node.

A8. The method of any of embodiments A1-A7, wherein submitting the blockchain operation to the blockchain node comprises: determining, based on a database lookup, an address for the second cryptography-based, storage application; generating, based on a blockchain protocol, an unsigned transaction; determining a nonce value; and determining a gas limit by simulating the blockchain transaction.

A9. The method of any of embodiments A1-A8, further comprising: receiving, at the first user interface, a fifth user request, wherein the fifth user request requests creation of a second user account for the decentralized application browser; in response to the fifth user request, generating the second user account; and in response to generating the second user account, generating a third cryptography-based, storage application, wherein the third cryptography-based, storage application corresponds to a third partial private key and a fourth partial private key, wherein the third partial private key is stored on the first remote device, and wherein the fourth partial private key is stored on the first user device.

A10. The method of any of embodiments A1-A9, wherein transferring the digital assets to the second cryptography-based, storage application further comprises: in response to generating the second cryptography-based, storage application, determining a threshold digital asset amount for the second cryptography-based, storage application; and generating an instruction to automatically transfer the threshold digital asset amount from the first cryptography-based, storage application to the second cryptography-based, storage application.

B1. A method for facilitating secure blockchain operations in decentralized applications using cryptography-based, storage applications in computer networks, the method comprising: receiving, via a user interface on a user device, a first user input, wherein the first user input requests access to a user account on a decentralized application for performing a plurality of blockchain operations; in response to the first user input: generating for display, in the user interface, a first icon, wherein the first icon corresponds to a first cryptography-based, storage application corresponding to the user account, wherein the first cryptography-based, storage application corresponds to a first partial private key and a second partial private key, wherein the first partial private key is stored on a remote device, and wherein the second partial private key is stored on the user device; and generating for display, in the user interface, a second icon, wherein the second icon corresponds to a second cryptography-based, storage application corresponding to the user account, wherein the second cryptography-based, storage application corresponds to a third partial private key and a fourth partial private key, wherein the third partial private key is stored on the remote device, and wherein the fourth partial private key is stored on the user device; receiving, via the user interface on the user device, a second user input, wherein the second user input selects the first icon for performing a blockchain operation of the plurality of blockchain operations; and in response to the second user input, performing the blockchain operation using the first cryptography-based, storage application.

B2. The method of embodiment B1, further comprising: receiving, via the user interface on the user device, a third user input, wherein the third user input selects the second icon for performing the blockchain operation of the plurality of blockchain operations; and in response to the third user input, performing the blockchain operation using the second cryptography-based, storage application.

B3. The method of any of embodiments B1-B2, further comprising: receiving, via the user interface on the user device, a fourth user input, wherein the fourth user input selects the first icon for performing an additional blockchain operation of the plurality of blockchain operations; determining a characteristic of the first cryptography-based, storage application and a characteristic of the additional blockchain operation; comparing the characteristic of the first cryptography-based, storage application and the characteristic of the additional blockchain operation; in response to determining that the characteristic of the first cryptography-based, storage application and the characteristic of the additional blockchain operation do not correspond, automatically determining a characteristic of the second cryptography-based, storage application; comparing the characteristic of the second cryptography-based, storage application and the characteristic of the additional blockchain operation; and in response to determining that the characteristic of the second cryptography-based, storage application and the characteristic of the additional blockchain operation do correspond, generating for display, the user interface on the user device, a recommendation to perform the additional blockchain operation using the second cryptography-based, storage application.

B4. The method of any of embodiments B1-B3, further comprising: determining a threshold digital asset amount for the first cryptography-based, storage application; and generating an instruction to automatically transfer the threshold digital asset amount from the second cryptography-based, storage application to the first cryptography-based, storage application.

B5. The method of any of embodiments B1-B4, wherein performing the blockchain operation comprises: determining that the blockchain operation corresponds to a request to read a contract state; and in response to determining that the blockchain operation corresponds to the request to read the contract state, retrieving data related to the contract state from a blockchain node.

B6. The method of any of embodiments B1-B5, wherein retrieving data related to the contract state from a blockchain node further comprises: determining, based on a database lookup, an address for the first cryptography-based, storage application; generating, based on a blockchain protocol, encoded data comprising a method name and parameter into a binary data format; transmitting a call request to the blockchain node with the encoded data; and parsing the data related to the contract state based on a response from the call request.

B7. The method of any of embodiments B1-B6, wherein performing the blockchain operation comprises: determining that the blockchain operation corresponds to a blockchain transaction; and in response to determining that the blockchain operation corresponds to the blockchain transaction, generating a digital signature based on the first partial private key and the second partial private key; signing the blockchain operation with the digital signature; and submitting the blockchain operation to a blockchain node.

B8. The method of any of embodiments B1-B7, wherein submitting the blockchain operation to the blockchain node: determining, based on a database lookup, an address for the first cryptography-based, storage application; generating, based on a blockchain protocol, an unsigned transaction; determining a nonce value; and determining a gas limit by simulating the blockchain transaction.

B9. The method of any of embodiments B1-B8, further comprising generating for display, in the user interface, a third icon, wherein the third icon corresponds to a third cryptography-based, storage application corresponding to the user account, wherein the third cryptography-based, storage application corresponds a first private key, and wherein the first private key is stored on the user device.

B10. The method of any of embodiments B1-B9, further comprising: receiving a fifth user input, at the user interface, wherein the fifth user input requests a status of digital assets for the first cryptography-based, storage application and the second cryptography-based, storage application; and in response to the second user request, querying a blockchain indexer for the decentralized application for blockchain operations related to the digital assets for the first cryptography-based, storage application and the second cryptography-based, storage application, simultaneously.

C1. A tangible, non-transitory, machine-readable medium storing instructions that, when executed by a data processing apparatus, cause the data processing apparatus to perform operations comprising those of any of embodiments A1-A10 or B1-B10.

C2. A system comprising one or more processors; and memory storing instructions that, when executed by the processors, cause the processors to effectuate operations comprising those of any of embodiments A1-A10 or B1-B10.

C3. A system comprising means for performing any of embodiments A1-A10 or B1-B10.

What is claimed:

1. A system for facilitating secure blockchain operations in decentralized applications using cryptography-based, storage applications in computer networks, the system comprising:

one or more processors and media storing instructions that, when executed by the one or more processors, cause operations comprising:

in response to receiving, via a user interface on a user device, a first user input requesting access to a user account associated with a decentralized application, generating for display, in the user interface on the user device, (i) a first icon that corresponds to a first cryptography-based, storage application associated with the user account and (ii) a second icon that corresponds to a second cryptography-based, storage application associated with the user account, wherein the second cryptography-based, storage application corresponds to a first partial private key stored on a remote device and a second partial private key stored on the user device;

in response to receiving, via the user interface on the user device, a second user input selecting the first icon for performing a blockchain operation, performing the blockchain operation using the first cryptography-based, storage application;

receiving, via the user interface on the user device, a third user input selecting the first icon for performing an additional blockchain operation;

in response to determining that a characteristic of the first cryptography-based, storage application and a characteristic of the additional blockchain operation do not correspond, automatically determining a characteristic of the second cryptography-based, storage application; and in response to determining that the characteristic of the second cryptography-based, storage application and the characteristic of the additional blockchain operation correspond, generating for display, in the user interface on the user device, a recommendation to perform the additional blockchain operation using the second cryptography-based, storage application.

2. A method for facilitating secure blockchain operations in decentralized applications using cryptography-based, storage applications in computer networks, the method comprising:

receiving, via a user interface on a user device, a first user input, wherein the first user input requests access to a user account in connection with a decentralized application for performing a plurality of blockchain operations;

in response to the first user input, generating for display, in the user interface, (i) a first icon that corresponds to a first cryptography-based, storage application associated with the user account and (ii) a second icon that corresponds to a second cryptography-based, storage application associated with the user account, wherein the second cryptography-based, storage application corresponds to a first partial private key stored on a remote device and a second partial private key stored on the user device; ;

receiving, via the user interface on the user device, a second user input, wherein the second user input selects the first icon for performing a blockchain operation of the plurality of blockchain operations;

in response to the second user input, performing the blockchain operation using the first cryptography-based, storage application;

receiving, via the user interface on the user device, a third user input, wherein the third user input selects the first icon for performing an additional blockchain operation;

determining that a characteristic of the first cryptography-based, storage application and a characteristic of the additional blockchain operation do not correspond;

in response to determining that the characteristic of the first cryptography-based, storage application and the characteristic of the additional blockchain operation do not correspond, automatically determining a characteristic of the second cryptography-based, storage application;

determining that the characteristic of the second cryptography-based, storage application and the characteristic of the additional blockchain operation correspond; and in response to determining that the characteristic of the second cryptography-based, storage application and the characteristic of the additional blockchain operation correspond, generating for display, in the user interface on the user device, a recommendation to perform the additional blockchain operation using the second cryptography-based, storage application.

3. The method of claim 2, wherein the first cryptography-based, storage application comprises a non-custodial wallet to which the first icon corresponds, and wherein the second cryptography-based, storage application comprises a semi-custodial wallet to which the second icon corresponds.

4. The method of claim 2, wherein the second cryptography-based, storage application comprises a semi-custodial wallet to which the second icon corresponds.

5. The method of claim 2, further comprising:

determining a threshold digital asset amount for the second cryptography-based, storage application;

receiving, via the user interface on the user device, a prior user input to create the second cryptography-based, storage application and generating the second cryptography-based, storage application based on the prior user input; and in response to generating the second cryptography-based, storage application, generating an instruction to automatically transfer the threshold digital asset amount from the first cryptography-based, storage application to the second cryptography-based, storage application.

6. The method of claim 2, wherein performing the blockchain operation comprises:

determining that the blockchain operation corresponds to a request to read a contract state; and in response to determining that the blockchain operation corresponds to the request to read the contract state, retrieving data related to the contract state from a blockchain node.

7. The method of claim 6, wherein retrieving the data related to the contract state comprises:

determining, based on a database lookup, an address for the first cryptography-based, storage application;

generating, based on a blockchain protocol, encoded data comprising a method name and parameter into a binary data format;

transmitting a call request to the blockchain node with the encoded data; and parsing the data related to the contract state based on a response from the call request.

8. The method of claim 2, wherein performing the blockchain operation comprises:

determining that the blockchain operation corresponds to a blockchain transaction;

in response to determining that the blockchain operation corresponds to the blockchain transaction, generating a digital signature derived from (i) a partial private key stored on the remote device and (ii) a partial private key stored on the user device;

signing the blockchain operation with the digital signature; and submitting the blockchain operation to a blockchain node.

9. The method of claim 8, wherein submitting the blockchain operation to the blockchain node comprises:

determining, based on a database lookup, an address for the first cryptography-based, storage application;

generating, based on a blockchain protocol, an unsigned transaction;

determining a nonce value; and determining a gas limit by simulating the blockchain transaction.

10. The method of claim 2, further comprising generating for display, in the user interface, a third icon, wherein the third icon corresponds to a third cryptography-based, storage application corresponding to the user account, wherein the third cryptography-based, storage application corresponds a first private key, and wherein the first private key is stored on the user device.

11. The method of claim 2, further comprising:

receiving a fifth user input, at the user interface, wherein the fifth user input requests a status of digital assets for the first cryptography-based, storage application and the second cryptography-based, storage application; and in response to the fifth user input, querying a blockchain indexer for the decentralized application for blockchain operations related to the digital assets for the first cryptography-based, storage application and the second cryptography-based, storage application, simultaneously.

12. One or more non-transitory computer-readable media comprising instructions that, when executed by one or more processors, causes operations comprising:

in response to receiving, via a user interface on a user device, a first user input t that requests access to a user account with which a non-custodial wallet and a semi-custodial wallet are associated, generating for display, in the user interface, (i) a first icon corresponding to the non-custodial wallet associated with the user account with (ii) a second icon corresponding to the semi-custodial wallet associated with the user account, wherein the semi-custodial wallet corresponds to a first partial private key stored on a remote device and a second partial private key stored on the user device;

receiving, via the user interface on the user device, a second user input that selects the first icon or the second icon for performing a blockchain operation;

in response to the second user input being a selection of the first icon corresponding to the non-custodial wallet, causing execution of a standalone application that (i) controls a private key corresponding to the non-custodial wallet and (ii) is separate from an application hosting the user interface, and performing the blockchain operation using the non-custodial wallet via the standalone application; and in response to the second user input being a selection of the second icon corresponding to the semi-custodial wallet, generating for display, in the user interface on the user device, one or more features for performing the blockchain operation using the semi-custodial wallet.

13. The one or more non-transitory computer-readable media of claim 12, wherein the instructions cause further operations comprising:

receiving, via the user interface on the user device, a third user input, wherein the third user input selects the first icon for performing an additional blockchain operation;

in response to the third user input that selects the first icon corresponding to the non-custodial wallet, generating for display, in the user interface on the user device, a recommendation to perform the additional blockchain operation using the semi-custodial wallet in lieu of using the non-custodial wallet corresponding to the selected first icon to perform the additional blockchain operation; and based on user acceptance of the recommendation, performing the additional_blockchain operation using the semi-custodial wallet.

14. The one or more non-transitory computer-readable media of claim 12, wherein the instructions cause further operations comprising:

receiving, via the user interface on the user device, a fourth user input, wherein the fourth user input selects the first icon for performing an additional blockchain operation;

determining a characteristic of the non-custodial wallet and a characteristic of the additional blockchain operation;

comparing the characteristic of the non-custodial wallet and the characteristic of the additional blockchain operation;

in response to determining that the characteristic of the non-custodial wallet and the characteristic of the additional blockchain operation do not correspond, automatically determining a characteristic of the semi-custodial wallet; and in response to determining that the characteristic of the semi-custodial wallet and the characteristic of the additional blockchain operation do correspond, generating for display, in the user interface on the user device, a recommendation to perform the additional blockchain operation using the semi-custodial wallet.

15. The one or more non-transitory computer-readable media of claim 14, wherein the instructions cause further operations comprising:

determining a threshold digital asset amount for the semi-custodial wallet; and in response to generating the semi-custodial wallet, generating an instruction to automatically transfer the threshold digital asset amount from the non-custodial wallet to the semi-custodial wallet.

16. The one or more non-transitory computer-readable media of claim 12, wherein performing the blockchain operation comprises:

determining that the blockchain operation corresponds to a request to read a contract state; and in response to determining that the blockchain operation corresponds to the request to read the contract state, retrieving data related to the contract state from a blockchain node.

17. The one or more non-transitory computer-readable media of claim 16, wherein retrieving the data related to the contract state comprises:
  determining, based on a database lookup, an address for the non-custodial wallet;
  generating, based on a blockchain protocol, encoded data comprising a method name and parameter into a binary data format;
  transmitting a call request to the blockchain node with the encoded data; and
  parsing the data related to the contract state based on a response from the call request.

18. The one or more non-transitory computer-readable media of claim 12, wherein performing the blockchain operation comprises:
  in response to determining that the blockchain operation corresponds to a blockchain transaction, generating a digital signature derived from (i) a partial private key stored on the remote device and (ii) a partial private key stored on the user device;
  signing the blockchain operation with the digital signature; and
  submitting the blockchain operation to a blockchain node.

19. The one or more non-transitory computer-readable media of claim 18, wherein submitting the blockchain operation to the blockchain node comprises:
  determining, based on a database lookup, an address for the non-custodial wallet;
  generating, based on a blockchain protocol, an unsigned transaction;
  determining a nonce value; and
  determining a gas limit by simulating the blockchain transaction.

20. The one or more non-transitory computer-readable media of claim 12, wherein the instructions cause further operations comprising generating for display, in the user interface, a third icon, wherein the third icon corresponds to a third cryptography-based, storage application corresponding to the user account, wherein the third cryptography-based, storage application corresponds a first private key, and wherein the first private key is stored on the user device.

* * * * *